(12) United States Patent
Wu et al.

(10) Patent No.: US 7,887,220 B2
(45) Date of Patent: Feb. 15, 2011

(54) HIGH POWERED LIGHT EMITTING DIODE LINEAR LIGHTING WITH ENHANCED UNIFORMITY AND ILLUMINATION

(75) Inventors: Rong-Yaw Wu, Hsin-Tien (TW); Chih Ming Yen, Hsin-Tien (TW); Chien Liang Liao, Hsin-Tien (TW); Yen-Chieh Chen, Hsin-Tien (TW)

(73) Assignee: Pixon Technologies Corp., Hsin-Tien (TW)

( * ) Notice: Subject to any disclaimer, the term of this patent is extended or adjusted under 35 U.S.C. 154(b) by 231 days.

(21) Appl. No.: 12/123,590

(22) Filed: May 20, 2008

(65) Prior Publication Data

US 2009/0290352 A1 Nov. 26, 2009

(51) Int. Cl.
*F21V 29/00* (2006.01)
(52) U.S. Cl. .................................. 362/294; 362/373
(58) Field of Classification Search ............. 362/294, 362/373, 600–634
See application file for complete search history.

(56) References Cited

U.S. PATENT DOCUMENTS

| | | | | |
|---|---|---|---|---|
| 6,367,941 B2* | 4/2002 | Lea et al. | | 362/619 |
| 2007/0159828 A1* | 7/2007 | Wang | | 362/294 |
| 2008/0055516 A1* | 3/2008 | Seo et al. | | 349/65 |
| 2008/0144319 A1* | 6/2008 | Chang et al. | | 362/294 |

* cited by examiner

Primary Examiner—Stephen F Husar
Assistant Examiner—James W Cranson
(74) *Attorney, Agent, or Firm*—Ming Chow; Sinorica, LLC

(57) ABSTRACT

A light emitting diode linear light which is high powered and has enhanced uniformity and illumination and is safe to humans, environmentally friendly, and possesses an extremely long lifetime is disclosed. The LED lighting comprises a polygonal light pipe, a light reflector panel, two LED packages, two LED PCBs, a plurality of heatsinks, a plurality of heat pipe assemblies, a protective housing, a back cover, and a diffuser cover. The polygonal light pipe comprises a transparent or semitransparent material. A patterned surface on the light emitting surface of the light pipe diffuses the emitted light. A patterned surface on the surface of the light pipe opposite the light emitting surface reflects light. The plurality of heat pipe assemblies comprise heatsinks and heat pipes. The heat pipes are hollow pipes that are filled with a liquid such as water or coolant and cooperate with the heatsinks to dissipate heat.

15 Claims, 19 Drawing Sheets
(1 of 19 Drawing Sheet(s) Filed in Color)

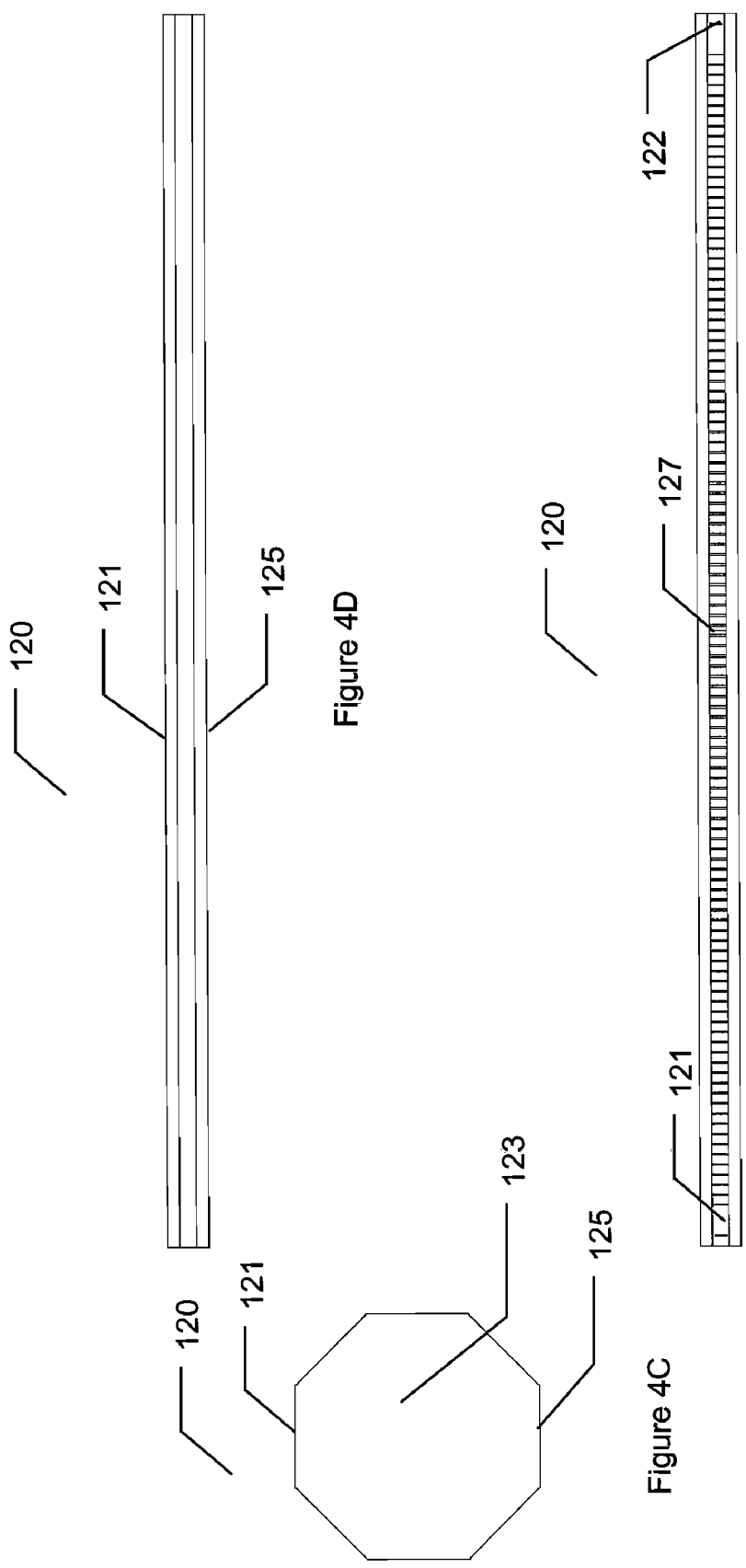

HIGH POWERED LIGHT EMITTING DIODE LINEAR LIGHTING WITH ENHANCED UNIFORMITY AND ILLUMINATION

BACKGROUND OF THE INVENTION

1. Field of the Invention

The present invention relates to a light source. More specifically, the present invention discloses a light emitting diode linear light which is high powered and has enhanced uniformity and illumination and is safe to humans, environmentally friendly, and possesses an extremely long lifetime.

2. Description of the Prior Art

Fluorescent lights are a commonly used light source. In a fluorescent light an electric current stimulates mercury atoms. This causes the mercury atoms to release ultraviolet photons which stimulate a phosphor. The stimulated phosphor then emits visible light photons.

A conventional fluorescent light installation consists of a sealed glass tube containing a small amount of mercury and inert gas with a phosphor powder coating on the inside of the glass tube. An electrode is situated on both ends of the sealed tube. A starter allows current to flow to turn on the fluorescent tube.

When alternating current is applied electrons migrate through the gas from one end of the tube to the other. As a result the liquid mercury turns into a gas. Collisions between electrons, charged atoms, and mercury atoms cause the electrons to move to a higher energy level. After a short period of time the electrons will return to their original energy level and release light photons.

Electrons in mercury atoms release light photons in the ultraviolet wavelength range which are not visible to humans. In order to convert the ultraviolet light into visible light the phosphor coating is used to release photons of a lower energy.

While fairly effective, the conventional fluorescent light source has numerous disadvantages. One disadvantage is that it can take several seconds for the fluorescent light to start emitting light.

Another disadvantage is that it is difficult to maintain a stable flow of current through the gas which in some cases can cause the light tube to explode or can destroy other components in the circuit.

In order to control the current, a ballast is used to slow down changes in the current by modulating the current at a low cycle rate. Unfortunately, this causes the light to flicker which is annoying and irritating.

Additionally, the ballast can vibrate at a low frequency which is audible to humans and causes further irritation. Workers in environments using fluorescent light have filed complaints of headaches, eye strain, and general eye discomfort.

Furthermore, disposal of fluorescent light systems is problematic since some of the waste is hazardous. For example, some ballasts contain polychlorinated biphenyls (PCBs) or 2-ethylhexyl phathatlate (DEHP) which are carcinogens that can cause liver, skin, and reproductive disorders. Also, fluorescent light tubes contain a small quantity of mercury that can be harmful to the environment and to human health.

In order to properly dispose of the fluorescent light systems special care must be taken and special hazardous waste landfills must be used. This is not only expensive and potentially dangerous but also damaging to the environment.

Therefore, there is need for an improved light source to replace fluorescent light systems that is high powered, economical, effective, safe to humans and the environment, and has enhanced uniformity and illumination.

SUMMARY OF THE INVENTION

To achieve these and other advantages and in order to overcome the disadvantages of the conventional device in accordance with the purpose of the invention as embodied and broadly described herein, the present invention provides a high powered light emitting diode linear lighting with enhanced uniformity and illumination.

An object of the present invention is to provide a light source to replace the conventional fluorescent light tube. The light emitting diode (LED) lighting of the present invention replaces fluorescent light tube fixtures, tungsten light fixtures, and incandescent light bulb fixtures.

The light source of the present invention comprises a polygonal light pipe, a light reflector panel, two LED packages, two LED printed circuit boards PCBs, a plurality of heatsinks, a plurality of heat pipe assemblies, a protective housing, a back cover, and a diffuser cover.

The polygonal light pipe comprises a transparent or semi-transparent material. A patterned surface on the light emitting surface of the light pipe diffuses the emitted light. A patterned surface on the surface of the light pipe opposite the light emitting surface reflects light. In this way, the emitted light is highly uniform.

The plurality of heat pipe assemblies comprise heatsinks and heat pipes. The heat pipes are hollow pipes that are filled with a liquid such as water or coolant and cooperate with the heatsinks to dissipate heat. As a result, the LED lighting of the present invention can be physically touched without concern of being burned and thereby the LED lighting can better meet safety requirements and standards.

Since the light source of the present invention utilizes LED light sources, the emitted light does not flicker and the light source turns on instantly without delay. Once turned on the light source immediately begins emitting a stable visible light. Not only is the light convenient but workers in the environment no longer suffer from discomfort such as headaches or sore eyes.

Additionally, the light source of the present invention does not contain mercury, lead or other harmful materials making disposal of the light source easy and safe for the environment.

In addition, the present invention does not emit UV radiation.

Another object of the present invention is to provide a low power consumption light source that uses little electricity and has a long lifetime. This results in major cost savings for consumers.

Another advantage of the present invention is that the light source of the present invention isn't pressurized. As a result, the light source of the present invention can't explode like a conventional fluorescent light tube.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The patent or application file contains at least one drawing executed in color. Copies of this patent or patent application publication with color drawing(s) will be provided by the office upon request and payment of the necessary fee.

The accompanying drawings are included to provide a further understanding of the invention, and are incorporated in and constitute a part of this specification. The drawings illustrate embodiments of the invention and, together with the description, serve to explain the principles of the invention. In the drawings:

FIG. 4b is a drawing illustrating a top view of an octagonal light pipe according to an embodiment of the present invention;

FIG. 4C is a drawing illustrating an end view of an octagonal light pipe according to an embodiment of the present invention;

FIG. 4D is a drawing illustrating a side view of an octagonal light pipe according to an embodiment of the present invention;

DESCRIPTION OF THE PREFERRED EMBODIMENTS

Figure 1A:
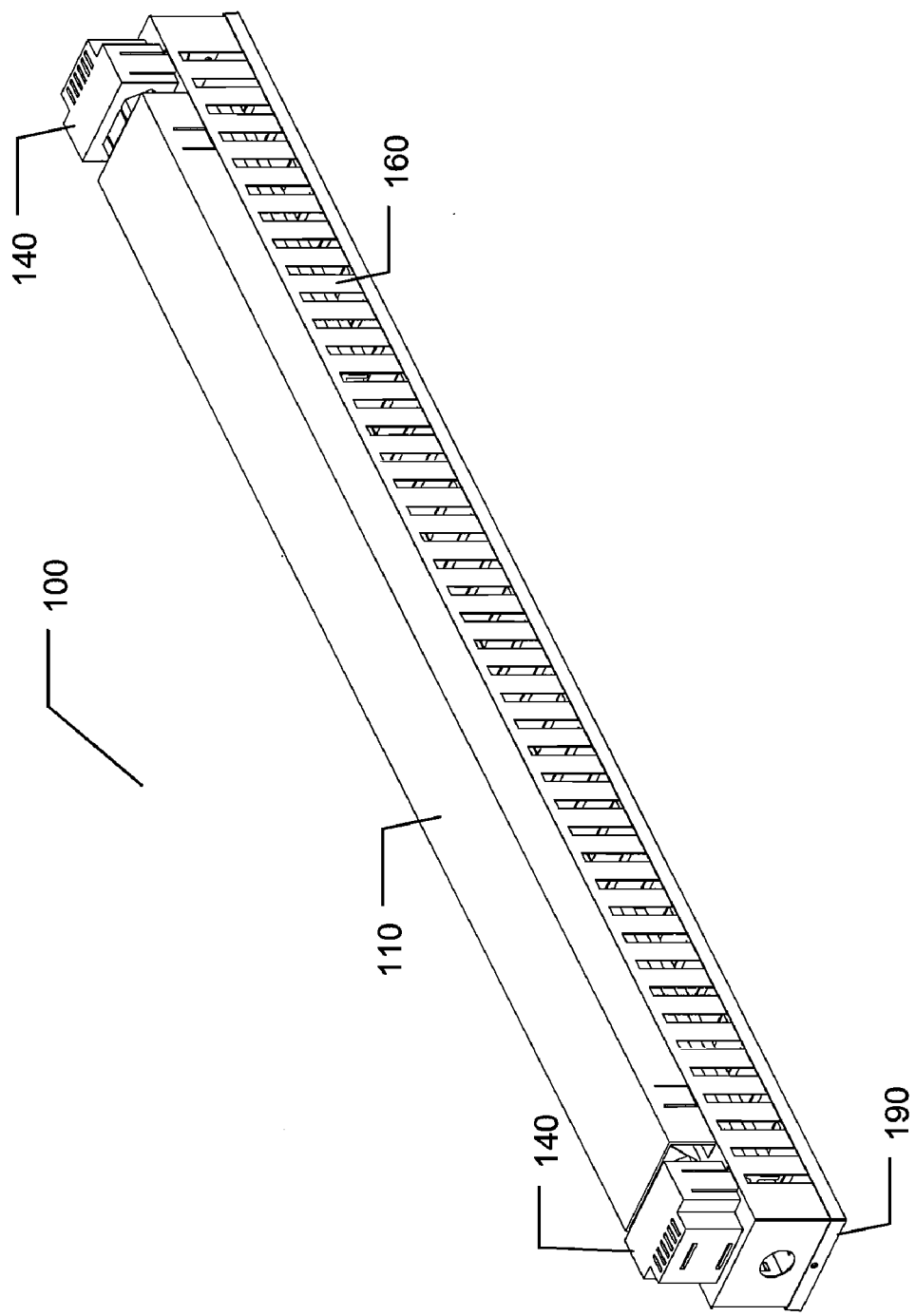
FIG. 1A is a drawing illustrating an assembled LED linear light according to an embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

Figure 1B:
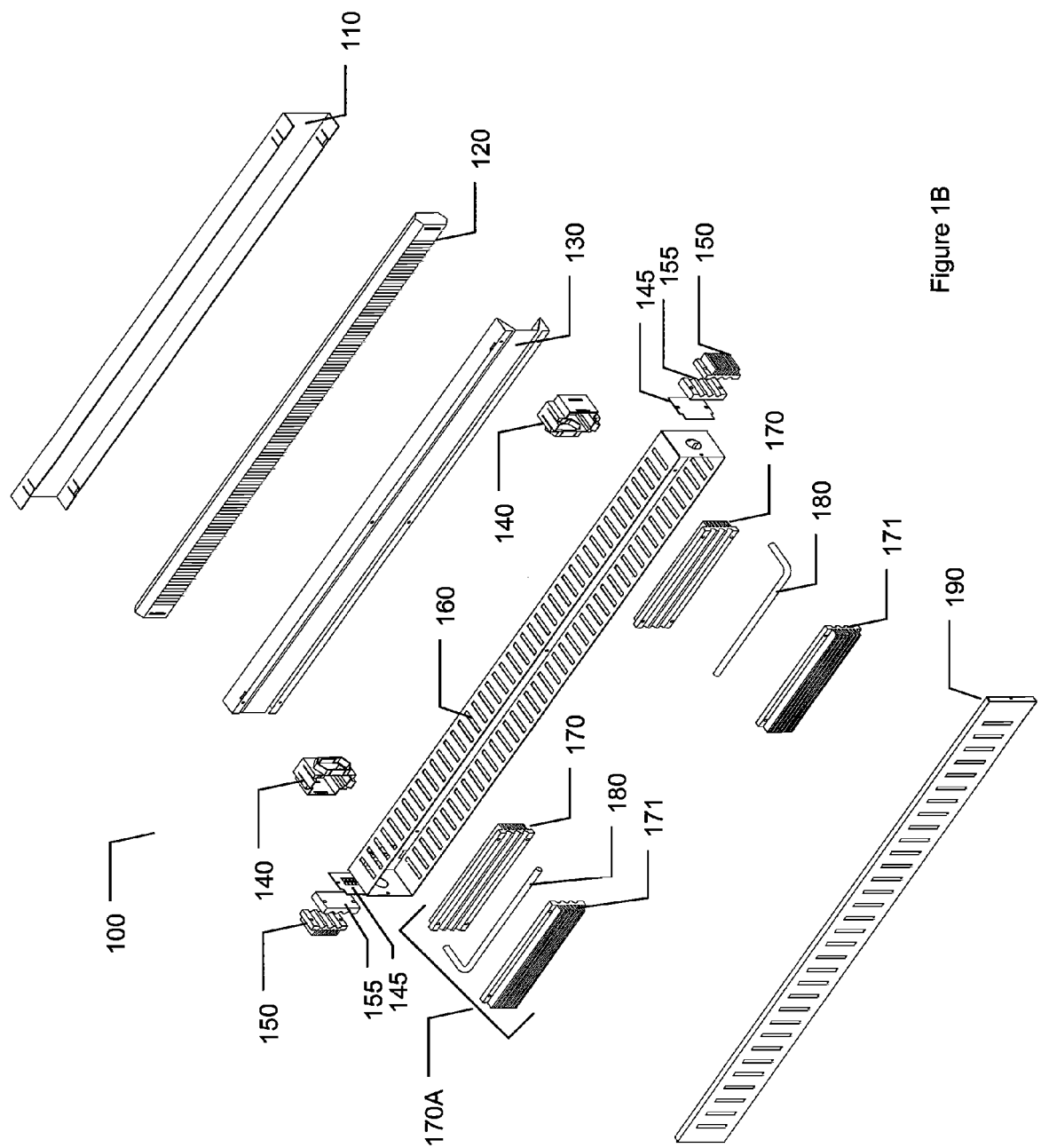
FIG. 1B is a drawing illustrating an exploded view of an LED linear light according to an embodiment of the present invention.

Refer to FIG. 1A, which is a drawing illustrating an assembled LED linear light according to an embodiment of the present invention and to FIG. 1B, which is a drawing illustrating an exploded view of an LED linear light according to an embodiment of the present invention.

As shown in FIGS. 1A and 1B the high powered LED linear lighting 100 of the present invention comprises a polygonal light pipe 120, a light reflector panel 130, two LED packages 140, two LED PCBs, a plurality of LED heatsinks 150 155, a plurality of heat pipe assemblies 170A, a protective housing 160, a back cover 190, and a diffuser cover 110.

The polygonal light pipe 120 comprises a transparent or semitransparent material. A patterned surface on the light emitting surface of the light pipe 120 diffuses the emitted light. A patterned surface on the surface of the light pipe 120 opposite the light emitting surface reflects light. In this way, the emitted light is highly uniform.

The plurality of heat pipe assemblies 170A comprises upper heatsinks 171, lower heatsinks 170 and heat pipes 180. The heat pipes 180 are hollow pipes that are filled with a liquid such as water or coolant and cooperate with the heatsinks 170 171 150 155 to dissipate heat. As a result, the LED lighting 100 of the present invention can be physically touched without concern of being burned.

Figure 2A:
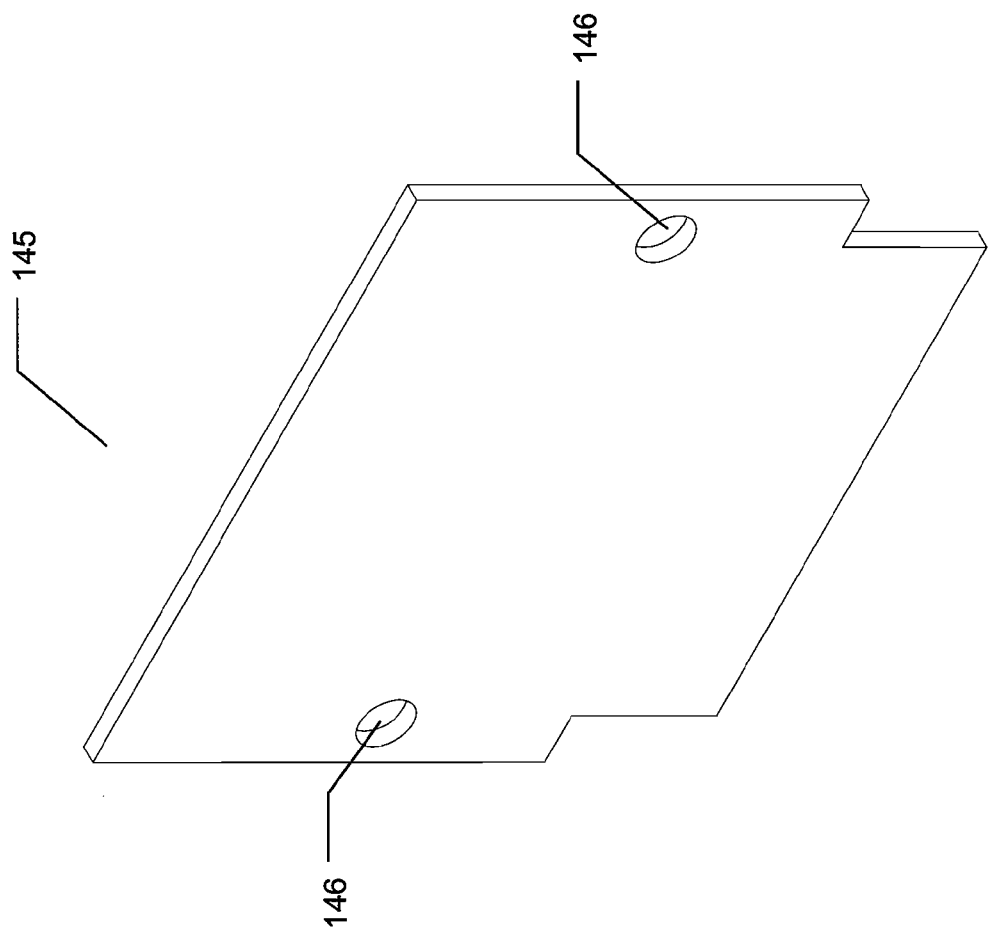
FIG. 2A is a drawing illustrating an LED printed circuit board according to an embodiment of the present invention.

Refer to FIG. 2A, which is a drawing illustrating an LED printed circuit board according to an embodiment of the present invention.

An LED PCB 145 is provided for each LED package. Both LED PCBs 145 comprise circuitry to control and direct power to the LED packages. The LED PCB 145 further comprises a plurality of mounting holes 146 to allow the LED PCB 145 to connect to the LED package.

Figure 2B:
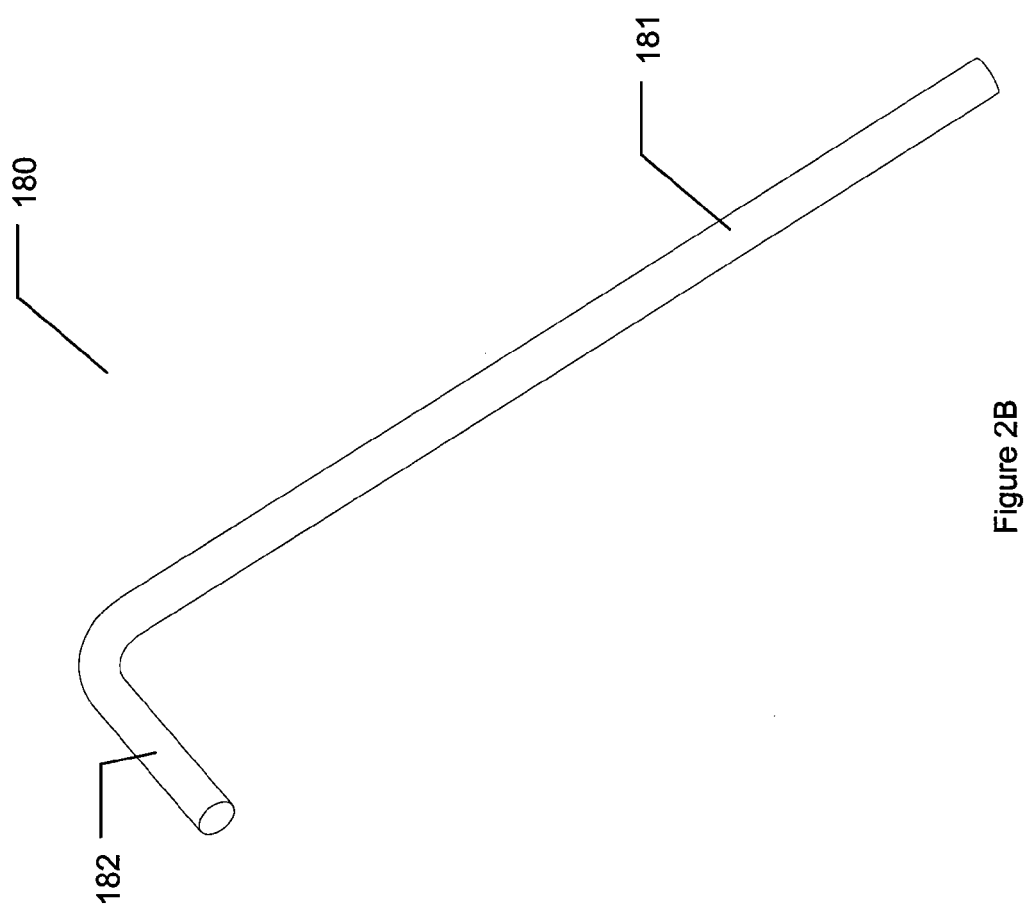
FIG. 2B is a drawing illustrating a sealed heat pipe according to an embodiment of the present invention.

Refer to FIG. 2B, which is a drawing illustrating a sealed heat pipe according to an embodiment of the present invention.

As shown in FIG. 2B the heat pipe 180 is a sealed hollow metal pipe filled with a liquid, for example, water or coolant. The heat pipes 180 in conjunction with the heatsinks dissipate heat to allow the LED lighting to operate at a lower temperature.

In the embodiment illustrated in FIG. 2B the heat pipe 180 comprises a 90 degree bend to form a short end 182 and a long end 181.

Figure 2C:
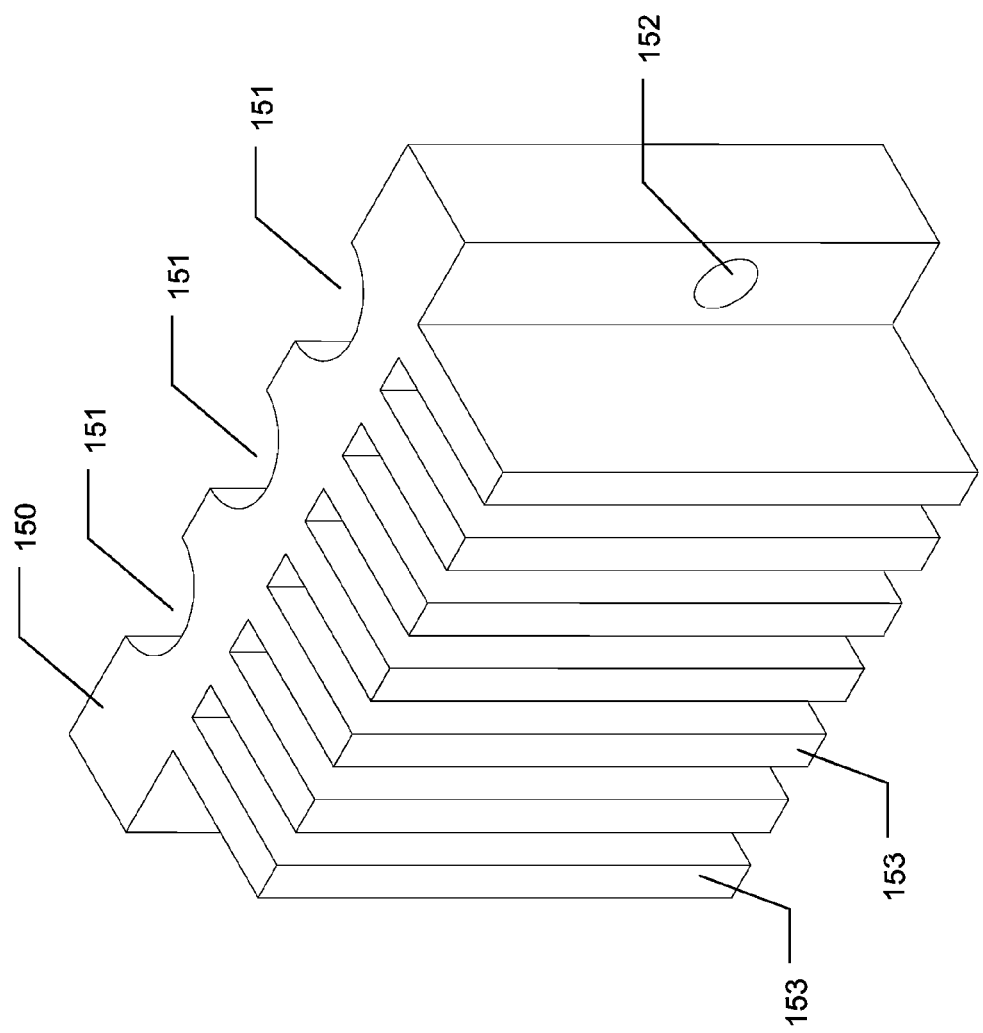
FIG. 2C is a drawing illustrating an upper LED heat sink according to an embodiment of the present invention.
Figure 2D:
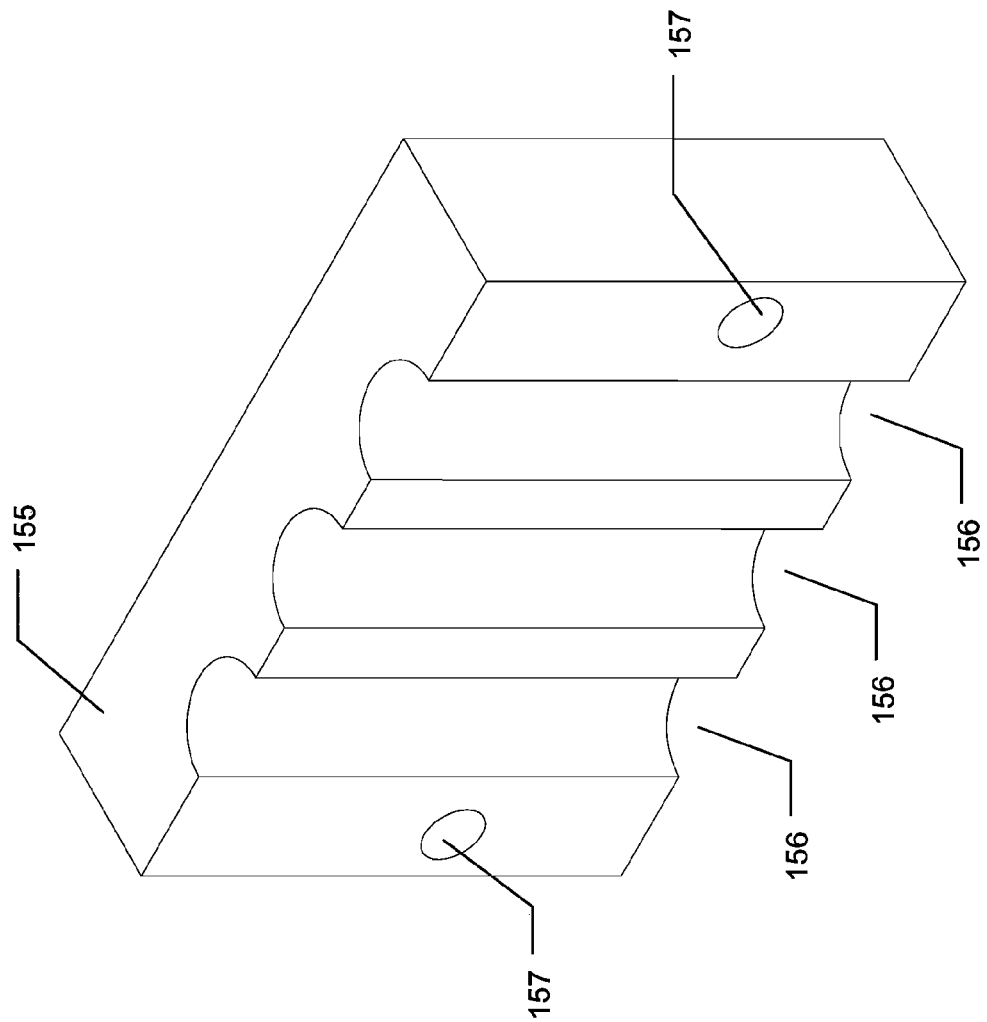
FIG. 2D is a drawing illustrating a lower LED heat sink according to an embodiment of the present invention.

Refer to FIG. 2C, which is a drawing illustrating an upper LED heatsink according to an embodiment of the present invention and to FIG. 2D, which is a drawing illustrating a lower LED heatsink according to an embodiment of the present invention.

In the embodiment illustrated in FIG. 2C and FIG. 2D an upper LED heatsink 150 and a lower LED heatsink 155 are provided on each end of the LED lighting. The upper LED heatsink 150 comprises a plurality of cooling fins 153 to aid in dissipating heat. The upper LED heatsink also comprises a plurality of mounting holes 152 and at least one concaved trough 151. The lower LED heatsink 155 also comprises a plurality of mounting holes 157 and at least one concaved trough 156.

In the embodiment illustrated in FIG. 2C and FIG. 2D the upper LED heatsink 150 and the lower LED heatsink 155 comprise 3 concaved troughs 151 156 each. In other embodiments the number of concaved troughs is increased or decreased depending upon the number of heat pipes used. For example, more heat pipes are used for higher power usage applications. When assembled, the short end (182 in FIG. 2B) of the heat pipe is positioned inside the concaved troughs of the upper LED heatsink and the lower LED heatsink.

Figure 2E:
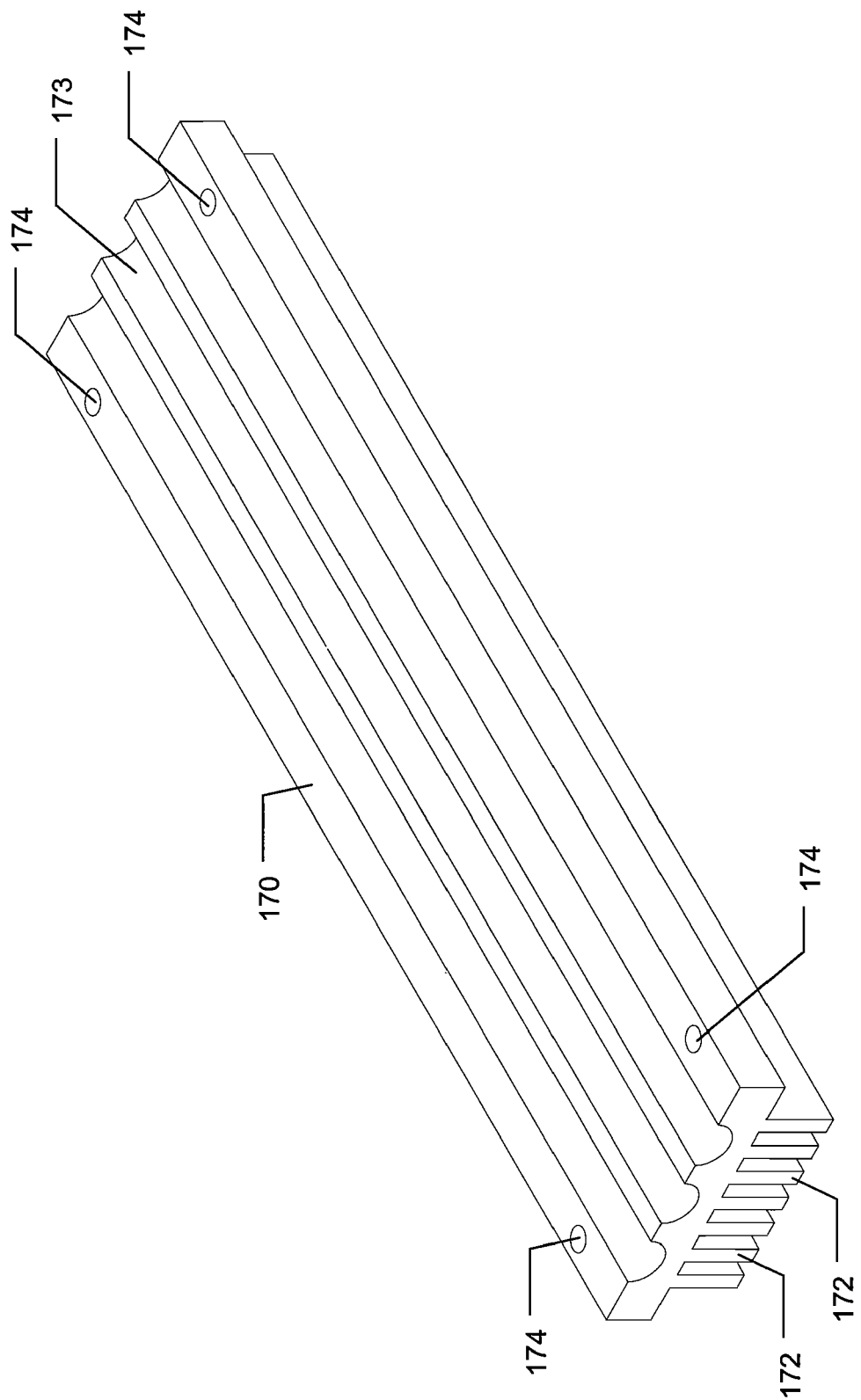
FIG. 2E is a drawing illustrating a heat sink of a heat pipe assembly according to an embodiment of the present invention.

Refer to FIG. 2E, which is a drawing illustrating a heatsink of a heat pipe assembly according to an embodiment of the present invention.

In the embodiment illustrated in FIG. 2E the heatsink 170 of the heat pipe assembly comprises a top heatsink (170 in FIG. 1B) and a bottom heatsink (171 in FIG. 1B) that are identical. In other embodiments the top heatsink and the bottom heatsink are different. Two heatsinks 170 are provided for a heat pipe. Each heatsink 170 comprises a plurality of mounting holes 174 and a plurality of cooling fins 172. Concaved troughs 173 are also provided. When assembled the top heatsink and the bottom heatsink are attached back to back with the long end (181 in FIG. 2B) of the heat pipe positioned inside the concaved trough 173 of the top heatsink and the bottom heatsink.

Figure 2F:
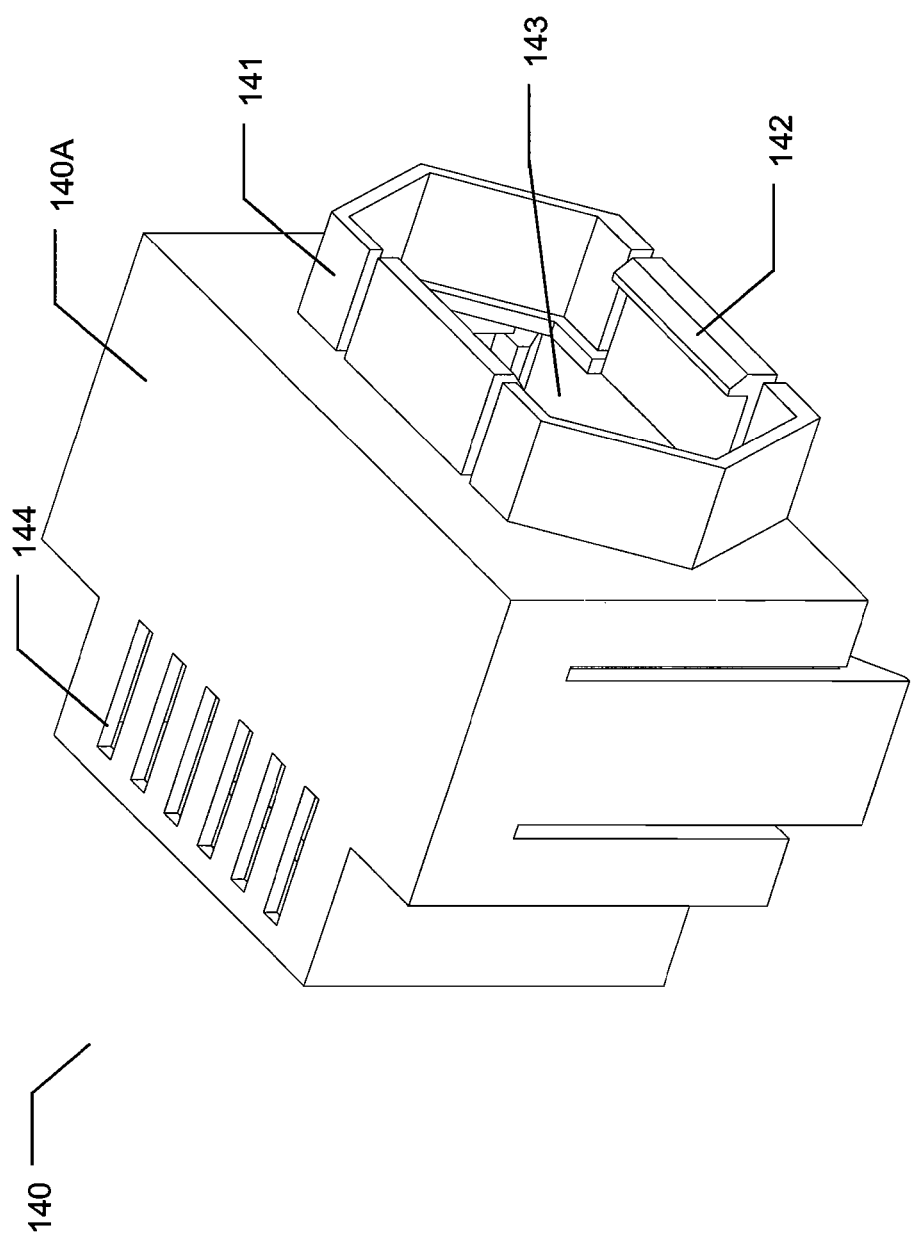
FIG. 2F is a drawing illustrating an LED package according to an embodiment of the present invention.

Refer to FIG. 2F, which is a drawing illustrating an LED package according to an embodiment of the present invention.

The LED package 140 of the LED lighting comprises an LED housing 140A with a plurality of vents 144 to allow heat to escape from the LED housing 140A. At least one LED is mounted in the LED housing 140A inside of an opening 143 of the LED housing 140A.

In an embodiment of the present invention a plurality of LEDs are used in each LED package 140. This provides flexibility in achieving desired light intensity or brightness.

In an embodiment of the present invention each LED package comprises a blue LED, a red LED, and a green LED.

The LED lighting of the present invention comprises two LED packages. One LED package is positioned at each end of the light pipe. The LED housing 140A further comprises a mounting flange 141 and a connecting tab 142. When assembled the light pipe rests inside the mounting flange 141 and the connecting tab 142 attaches to a connecting slot in the light pipe and holds the LED package 140 connected to the light pipe.

Figure 2G:
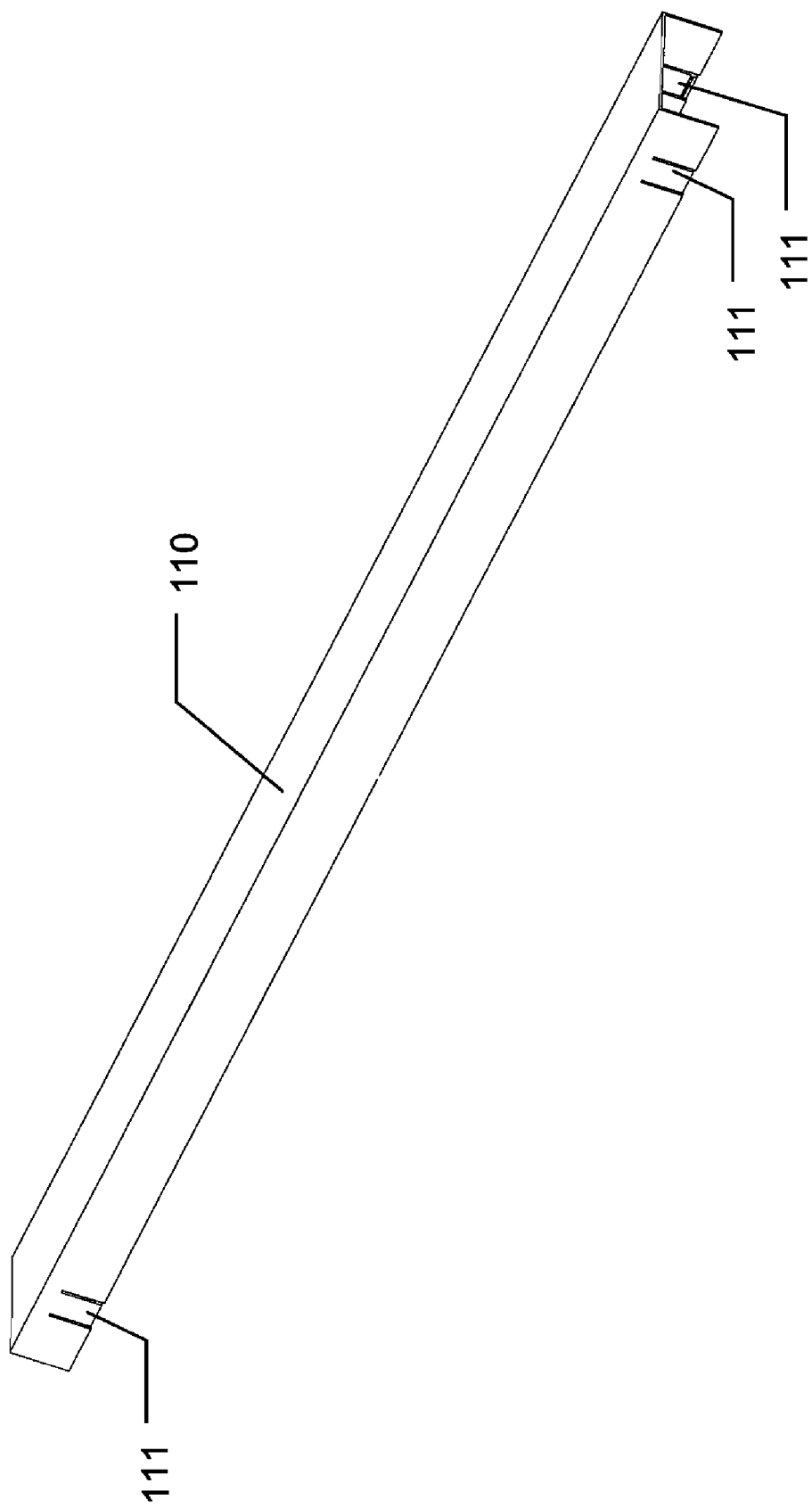
FIG. 2G is a drawing illustrating a diffuser cover according to an embodiment of the present invention.

Refer to FIG. 2G, which is a drawing illustrating a diffuser cover according to an embodiment of the present invention.

In an embodiment of the present invention a diffuser cover 110 is provided. The diffuser cover 110 comprises a semitransparent or transparent material and diffuses the light emitted by the LED lighting. The diffuser cover 110 also comprises a plurality of tabs 111 to hold the diffuser cover to the LED lighting assembly.

Figure 2H:
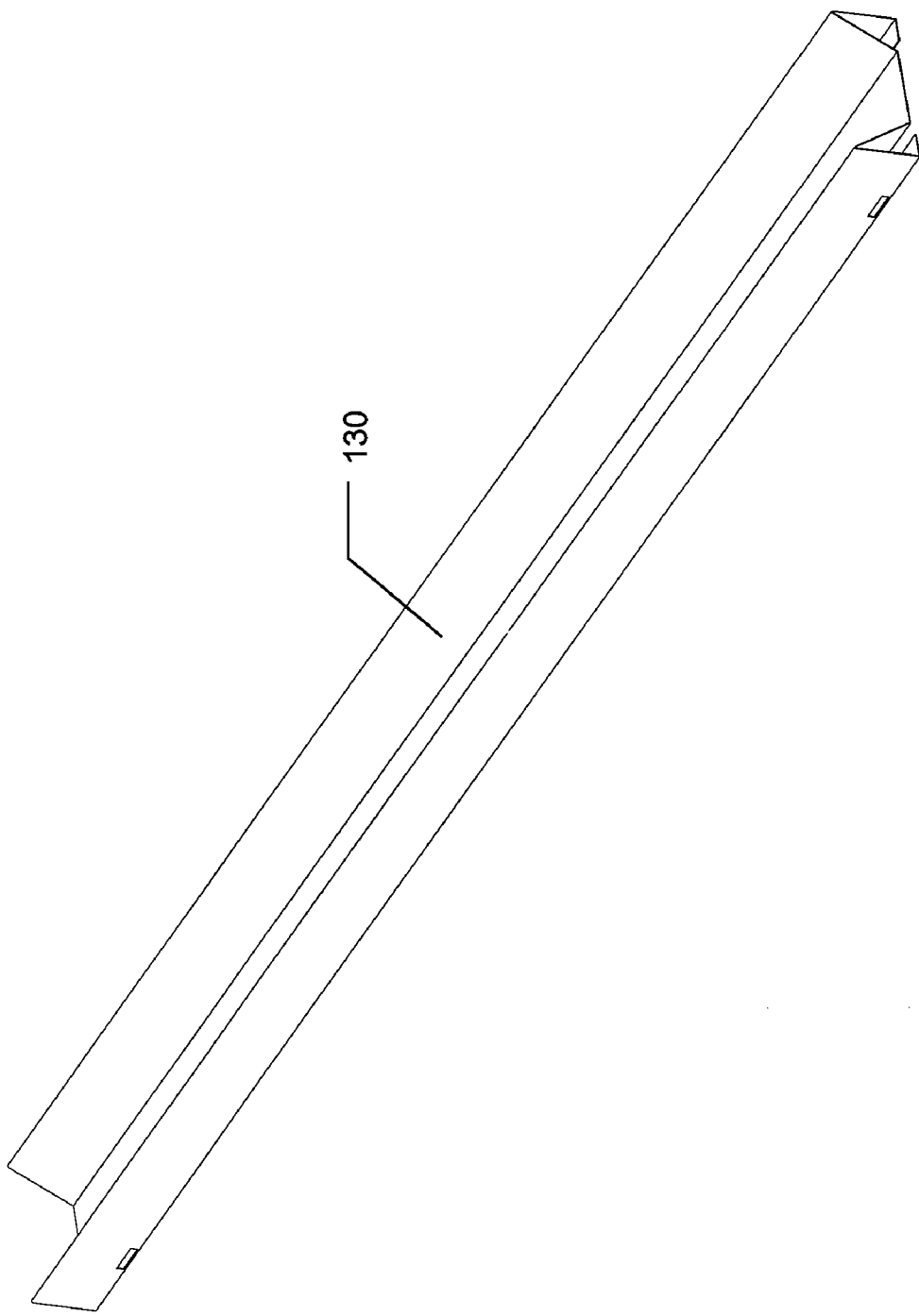
FIG. 2H is a drawing illustrating a reflector according to an embodiment of the present invention.

Refer to FIG. 2H, which is a drawing illustrating a reflector according to an embodiment of the present invention.

The LED lighting of the present invention further comprises a reflector 130. The reflector 130 comprises a reflective, coated, or plated material. The sides of the reflector 130 are angled or curved to improve the reflective properties of the reflector 130. The reflector 130 is mounted inside the protective housing under the light pipe and reflects light back towards the front of the LED lighting. The reflector 130 improves the efficiency of the LED lighting by directing the light in the desired direction.

Figure 2I:
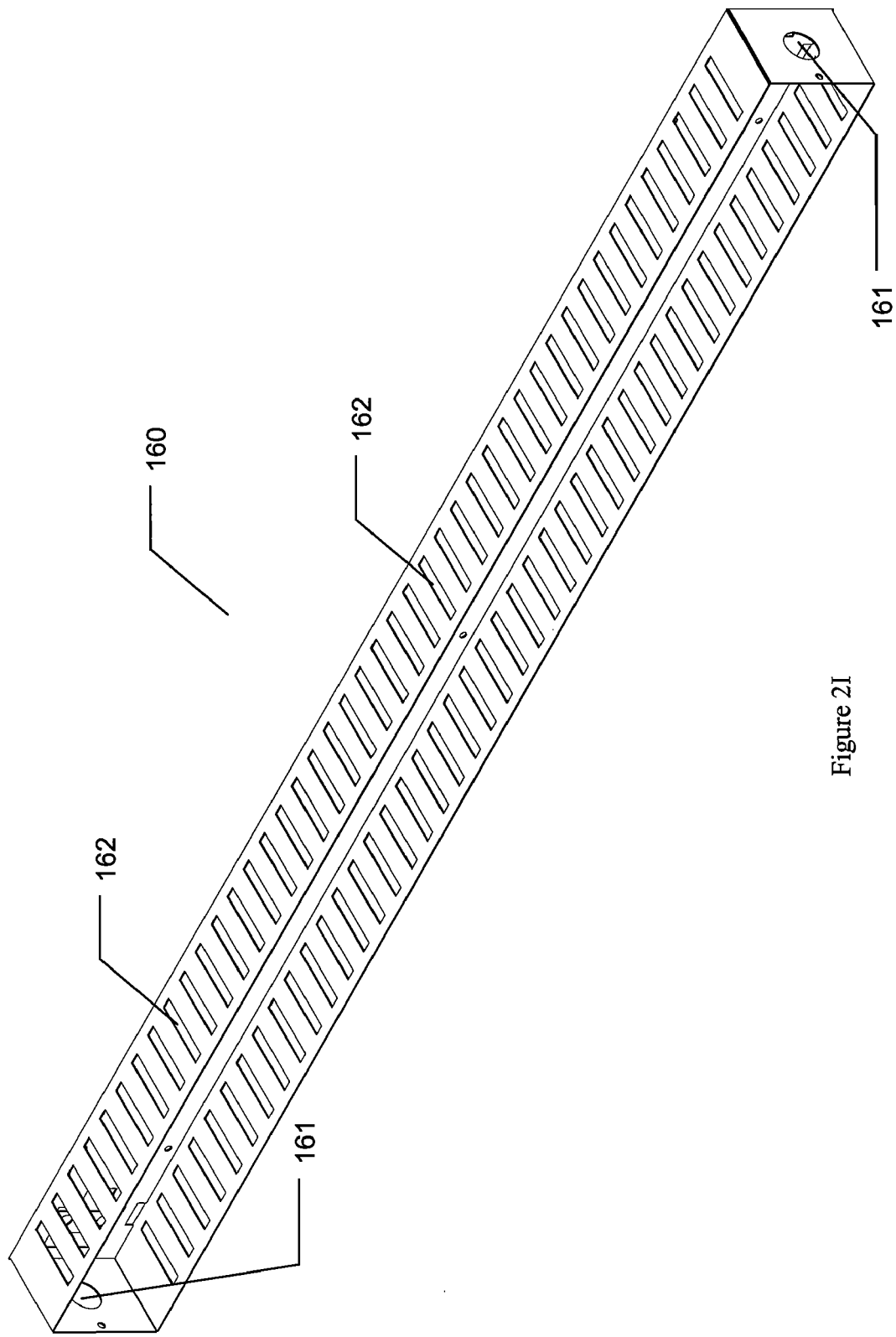
FIG. 2I is a drawing illustrating a protective housing according to an embodiment of the present invention.

Refer to FIG. 2I, which is a drawing illustrating a protective housing according to an embodiment of the present invention.

As shown in FIG. 2I the LED lighting of the present invention further comprises a protective housing 160. The protective housing 160 is the main body of the LED lighting and most of the components of the LED lighting are mounted inside the protective housing 160. The protective housing 160 comprises a plurality of vents 162 and end holes 161. The vents 162 allow heat to escape from the LED lighting.

Figure 2J:
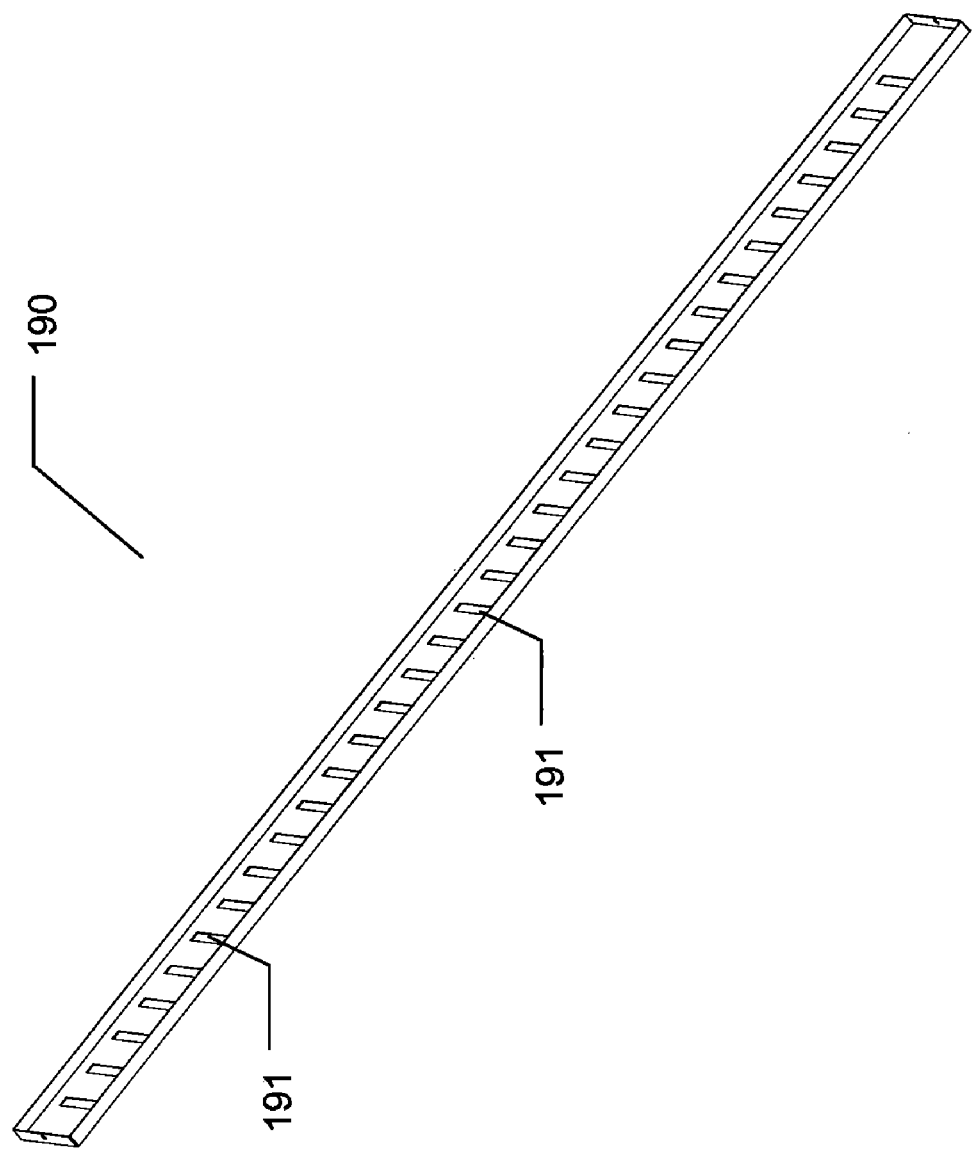
FIG. 2J is a drawing illustrating a back cover according to an embodiment of the present invention.

Refer to FIG. 2J, which is a drawing illustrating a back cover according to an embodiment of the present invention.

A back cover 190 attaches to the protective housing illustrated in FIG. 2I. Similar to the protective housing the back cover comprises a plurality of vents 191 to allow heat to escape.

Figure 2K:
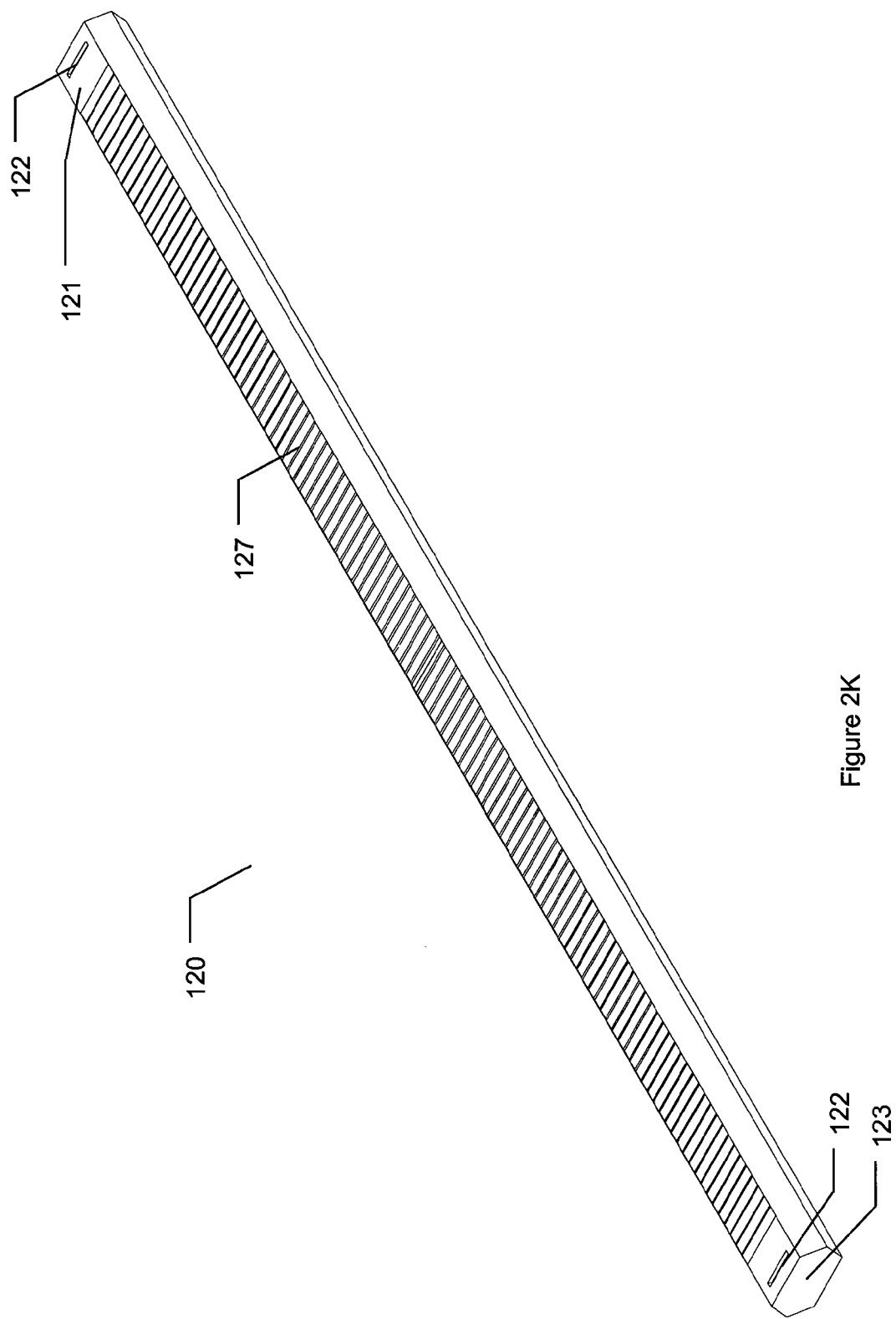
FIG. 2K is a drawing illustrating a hexagonal light pipe according to an embodiment of the present invention.
Figure 3A:
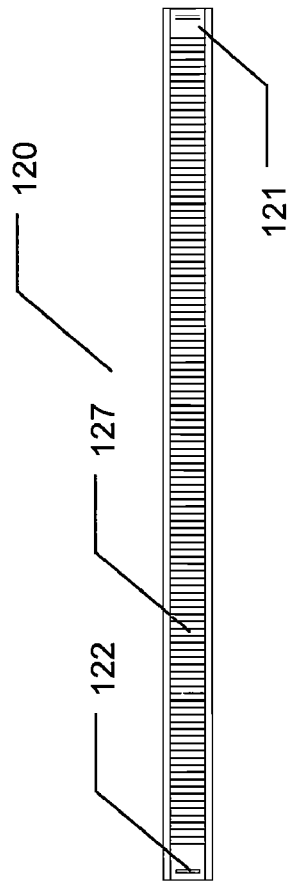
FIG. 3A is a drawing illustrating a top view of a hexagonal light pipe according to an embodiment of the present invention.
Figure 3C:
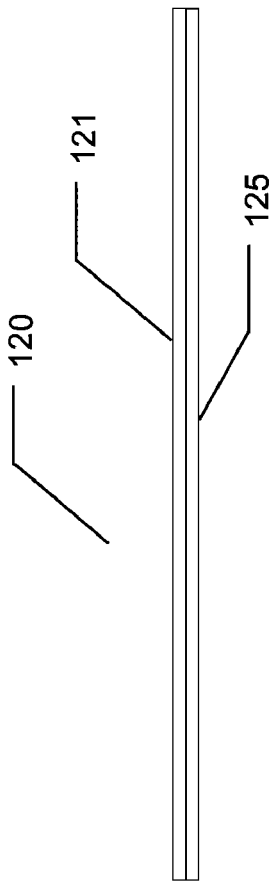
FIG. 3C is a drawing illustrating a side view of a hexagonal light pipe according to an embodiment of the present invention.
Figure 3B:
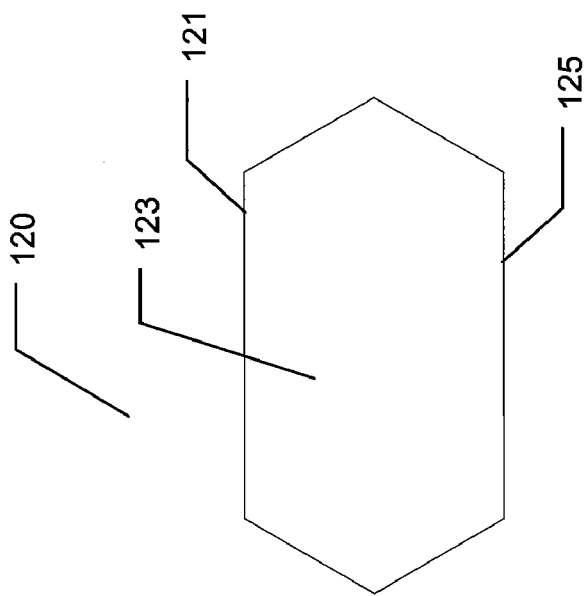
FIG. 3B is a drawing illustrating an end view of a hexagonal light pipe according to an embodiment of the present invention.
Figure 3D:
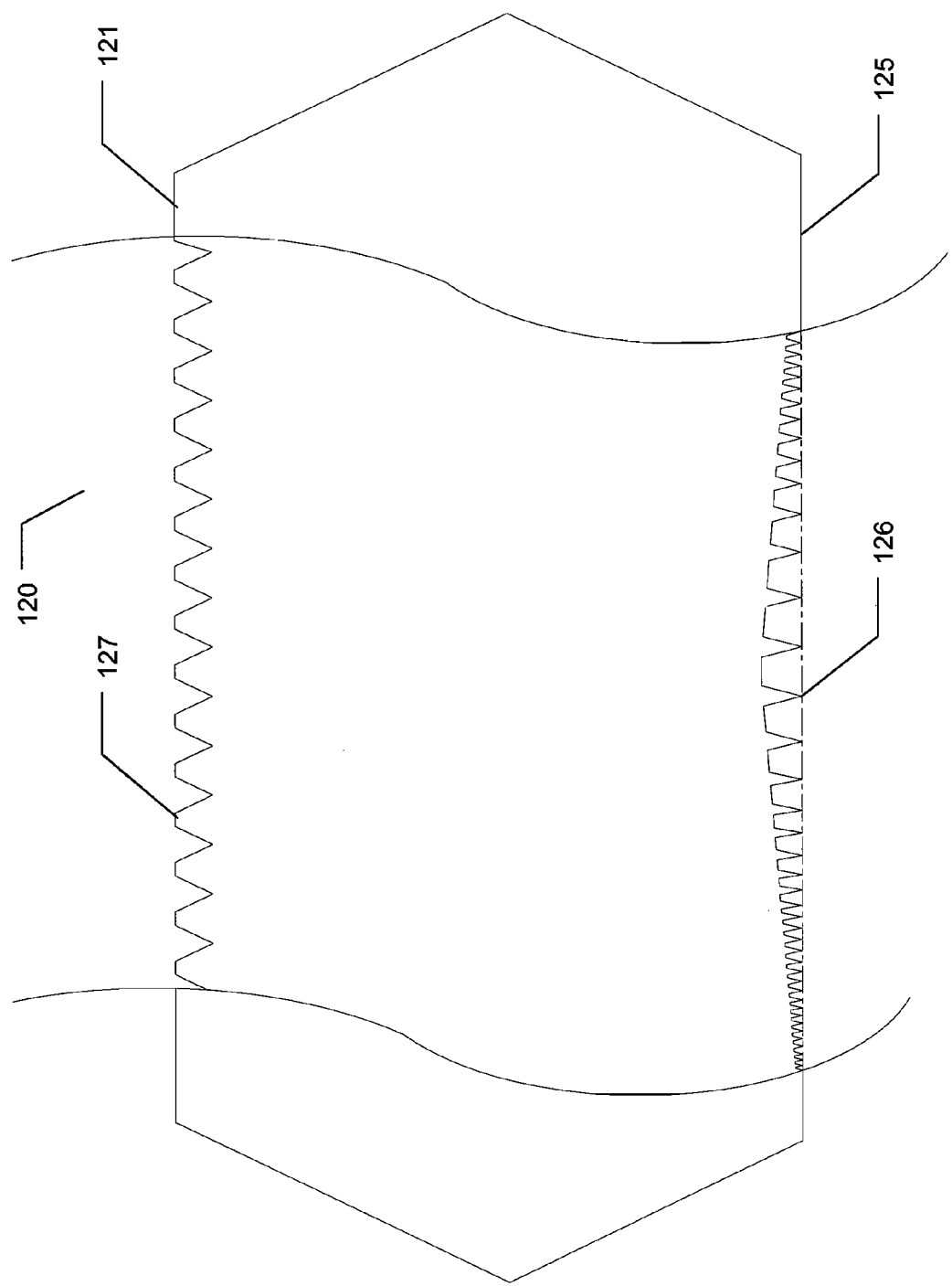
FIG. 3D is a drawing illustrating a light reflecting pattern and a light diffusing patter for a hexagonal light pipe according to an embodiment of the present invention.

Refer to FIG. 2K, which is a drawing illustrating a hexagonal light pipe according to an embodiment of the present invention to FIG. 3A, which is a drawing illustrating a top view of a hexagonal light pipe according to an embodiment of the present invention to FIG. 3B, which is a drawing illustrating an end view of a hexagonal light pipe according to an embodiment of the present invention, to FIG. 3C, which is a drawing illustrating a side view of a hexagonal light pipe according to an embodiment of the present invention and to FIG. 3D, which is a drawing illustrating a light reflecting pattern and a light diffusing patter for a hexagonal light pipe according to an embodiment of the present invention.

In the embodiment illustrated in FIGS. 2K and 3A-3D the polygonal light pipe 120 of the present invention comprises a hexagonal light pipe 120. The light pipe 120 comprises a transparent or semitransparent material. A light diffusing pattern 126 on the light emitting surface 125 of the light pipe 120 diffuses the emitted light. A light reflecting pattern 127 on the surface of the light pipe opposite the light emitting surface 125 reflects light that would normally escape the light pipe 120 back into the light pipe 120. In this way, the emitted light is highly uniform. The surface of the light pipe 120 opposite the light emitting surface 125 is considered the light reflecting surface 121 of the light pipe 120.

In the embodiment illustrated in FIG. 3D the light reflecting pattern 127 on the light reflecting surface 121 comprises a plurality of notches of equal size. The light diffusing pattern 126 on the light emitting surface 125 comprises a plurality of notches that increase in size as the pattern 126 moves closer to the center of the light pipe. Since the light intensity is greatest at the ends of the light pipe which are closest to the LED packages more diffusion is required. Moving towards the center of the light pipe less diffusion is needed so the notches are larger.

It should be noted that both the light diffusing pattern 126 and the light reflecting pattern 127 run from end to end on the light pipe and not side to side.

The light pipe 120 further comprises connecting slots 122 positioned closely to the ends 123 of the light pipe 120 which mate with connecting tabs (142 in FIG. 2F) to hold the LED packages to the light pipe 120.

Figure 4A:
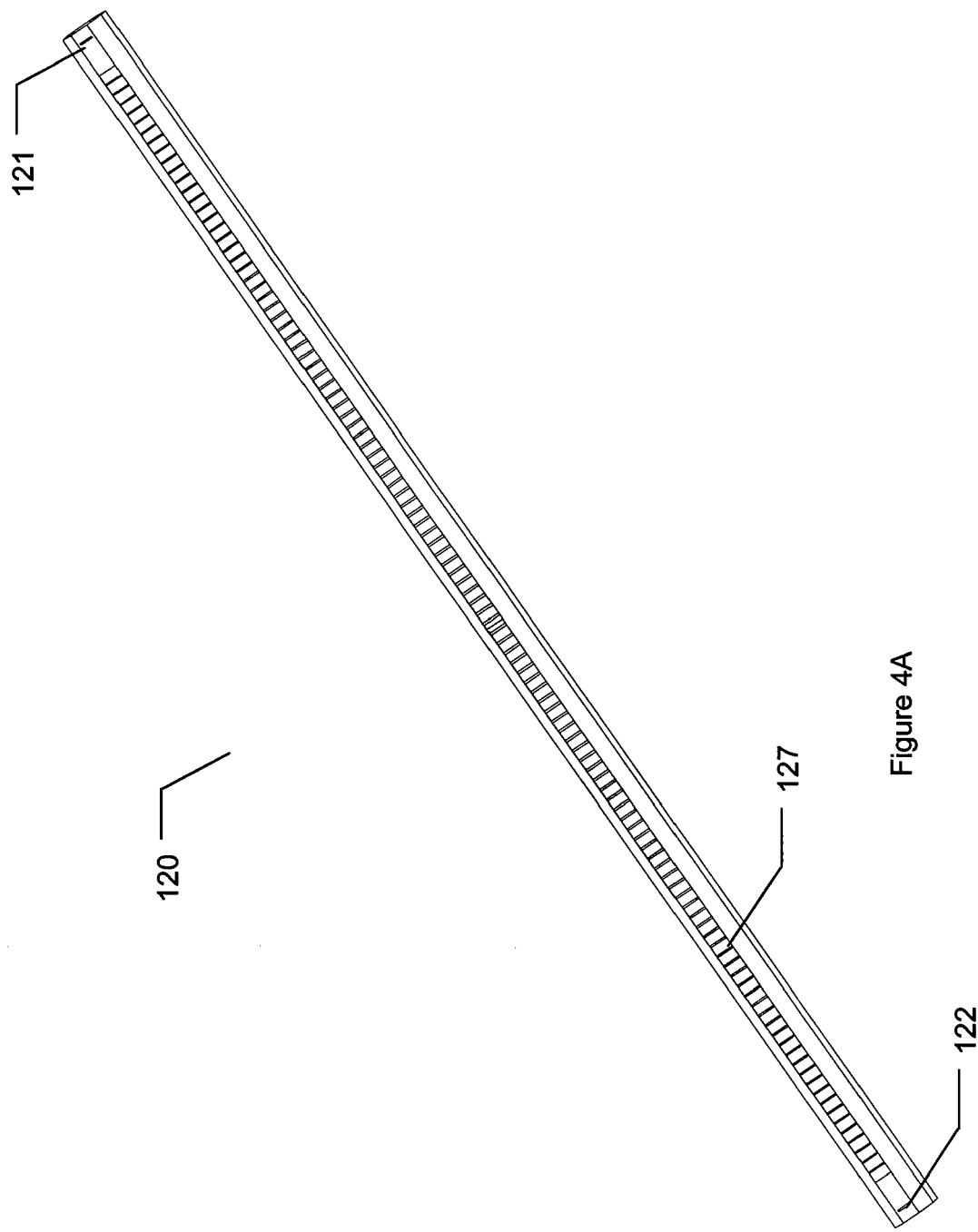
FIG. 4A is a drawing illustrating an octagonal light pipe according to an embodiment of the present invention.
Figure 4E:
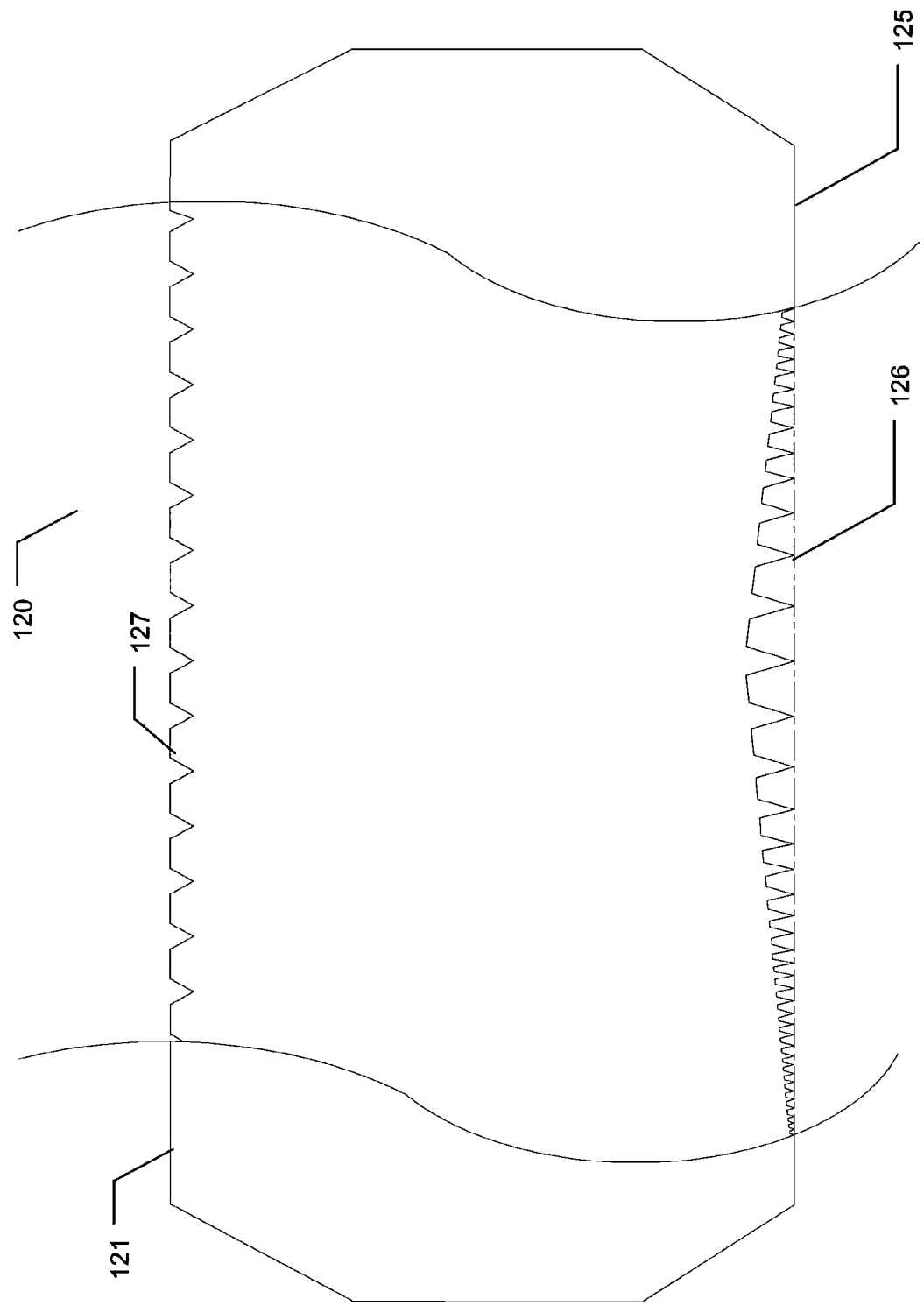
FIG. 4E is a drawing illustrating a light reflecting pattern and a light diffusing pattern for an octagonal light pipe according to an embodiment of the present invention.

Refer to FIG. 4A, which is a drawing illustrating an octagonal light pipe according to an embodiment of the present invention to FIG. 4b, which is a drawing illustrating a top view of an octagonal light pipe according to an embodiment of the present invention to FIG. 4C, which is a drawing illustrating an end view of an octagonal light pipe according to an embodiment of the present invention to FIG. 4D, which is a drawing illustrating a side view of an octagonal light pipe according to an embodiment of the present invention and to FIG. 4E, which is a drawing illustrating a light reflecting pattern and a light diffusing pattern for an octagonal light pipe according to an embodiment of the present invention.

In the embodiment illustrated in FIGS. 4A-4D the polygonal light pipe 120 comprises a light pipe similar to the hexagonal light pipe previously described but with an octagonal shape. In this embodiment the mounting flanges (141 in FIG. 2F) are octagonal to mate with the octagonal light pipe 120.

Refer again to FIGS. 1A and 1B. The LED lighting 100 of the present invention is assembled as follows. Note that obviously the order of the assembly can be altered. One LED package 140 is connected to each end of the light pipe 120. The connecting tabs of the LED package grasp the connecting slots of the light pipe and hold the LED packages and the light pipe together. The long end of the heat pipe 180 is positioned between the top heatsink 170 and the bottom heatsink 171. The long end of the heat pipe 180 rests inside the concaved troughs of the two heatsinks when the heatsinks are connected back to back. One LED PCB 145 is electrically coupled to each LED package 140 and one upper LED heatsink 150 and one lower LED heatsink 155 are mounted to each LED PCB 145. The short end of the heat pipe 180 is positioned between the upper LED heatsink 150 and the lower LED heatsink 155. The short end of the heat pipe 180 rests inside the concaved troughs of the upper LED heatsink 150 and the lower LED heatsink 155. The reflector 130 is positioned inside the protective housing 160 under the light pipe 120. The light pipe 120, reflector 140, heat pipe assemblies 170A, upper heatsinks 150, lower heatsinks 155, LED PCBs 145, and LED packages 140 are all positioned inside the protective housing 160. The back cover 190 connects to the back of the protective housing 160. The diffuser cover connects to the front of the protective housing 160.

In applications where alternating current AC is used a converter is provided. For example, an AC to DC switching power supply or an AC to DC converter is provided to convert an input alternating current to a fixed current to the LED PCBs. In embodiments of the present invention the conversion is performed by circuitry inside the LED lighting. In other embodiments of the present invention the conversion is performed by circuitry external to the protective housing of the LED lighting.

In applications where DC power is provided no conversion is necessary. In an embodiment of the present invention a battery or plurality of batteries are provided inside the protective housing to supply power to the LED lighting.

In application, power is supplied to the LED packages via the LED PCBs. The LEDs in the LED packages turn on and emit light into the light pipe through the end surfaces of the light pipe. The light travels through the light pipe and is emitted from the patterned light emitting surface of the light pipe or reflected by the patterned light reflecting surface of the light pipe or the reflector and emitted from the light emitting surface of the light pipe.

Figure 5:
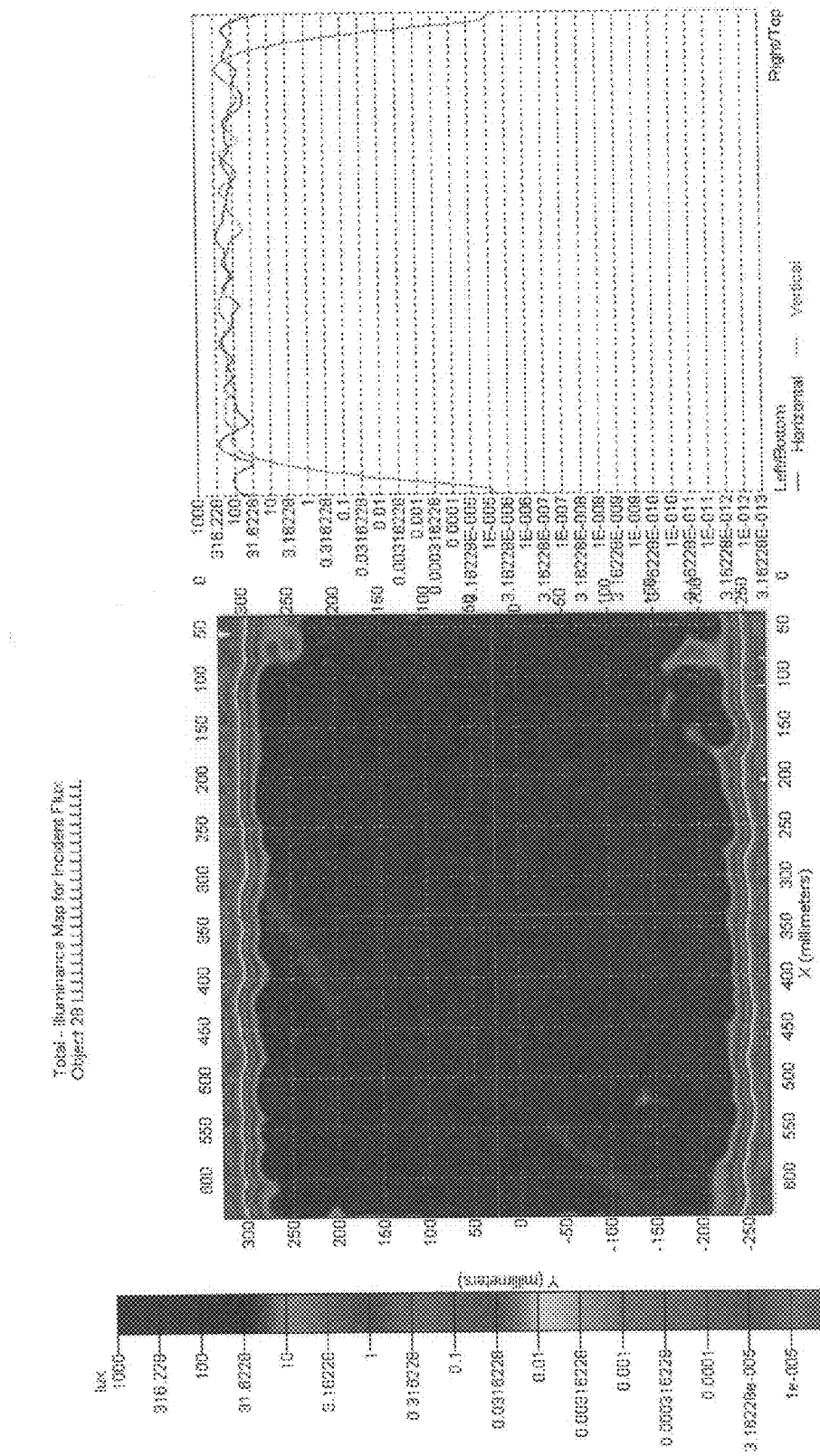
FIG. 5 are results of lighting tests of the LED lighting according to an embodiment of the present invention.

Refer to FIG. 5, which are results of lighting tests of the LED lighting according to an embodiment of the present invention.

The illumination maps shown in FIG. 5 clearly illustrate the enhanced uniformity and illumination of the high powered LED linear lighting of the present invention.

In an embodiment of the present invention the high powered LED linear lighting comprises a single heat pipe.

In an embodiment of the present invention the top and bottom heatsink are a single piece.

In an embodiment of the present invention the upper and lower heatsink are a single piece.

In an embodiment of the present invention the protective housing and the back cover are a single piece.

In an embodiment of the present invention the protective housing acts as the reflector.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A high powered light emitting diode linear light comprising:
   a protective housing;
   a bottom cover connected to the protecting housing;
   a reflector attached to the protective housing;
   at least one heat pipe assembly mounted inside the protective housing;
   a polygonal light pipe positioned above the reflector;
   a light emitting diode package disposed on both ends of the polygonal light pipe;
   a light emitting diode printed circuit board coupled to each light emitting diode package;
   at least one light emitting diode heatsink attached to each light emitting diode printed circuit board; and
   the polygonal light pipe and the light emitting diode package comprising mating elements to allow the polygonal light pipe and the light emitting diode package to connect together.

2. The high powered light emitting diode linear light of claim 1, the at least one heat pipe assembly comprising:
   a bottom heatsink;
   a top heatsink; and
   a heat pipe positioned between the bottom heatsink and the top heatsink.

3. The high powered light emitting diode linear light of claim 2, the heat pipe comprising a sealed hollow pipe filled with a liquid.

4. The high powered light emitting diode linear light of claim 3, the liquid comprising water.

5. The high powered light emitting diode linear light of claim 3, the liquid comprising coolant.

6. The high powered light emitting diode linear light of claim 1, the light emitting diode package comprising:
   a light emitting diode housing; and
   at least one light emitting diode mounted in the light emitting diode housing.

7. The high powered light emitting diode linear light of claim 1, the protective housing and the bottom cover comprising a plurality of openings to aid in cooling.

8. The high powered light emitting diode linear light of claim 1, the light emitting diode printed circuit board and the at least one light emitting diode heatsink comprising holes to allow the light emitting diode circuit board and the at least one light emitting diode heatsink to be attached to the light emitting diode package.

9. The high powered light emitting diode linear light of claim 1, the polygonal light pipe comprising a light diffusing pattern on a light emitting surface of the light pipe.

10. The high powered light emitting diode linear light of claim 9, the light diffusing pattern comprising a plurality of notches.

11. The high powered light emitting diode linear light of claim 10, the plurality of notches increasing in size moving closer to a center of the light pipe.

12. The high powered light emitting diode linear light of claim 1, the polygonal light pipe comprising a light reflecting pattern on a surface opposite a light emitting surface of the light pipe.

13. The high powered light emitting diode linear light of claim 12, the light reflecting pattern comprising a plurality of notches of equal size.

14. The high powered light emitting diode linear light of claim 1, the at least one light emitting diode heatsink comprising:
   an upper heatsink; and
   a lower heatsink.

15. The high powered light emitting diode linear light of claim 1, further comprising:
   a diffuser cover over a light emitting surface of the light pipe.

* * * * *